United States Patent
Zhou

(10) Patent No.: US 12,542,965 B2
(45) Date of Patent: Feb. 3, 2026

(54) OBJECT TRACKING METHOD AND ELECTRONIC DEVICE

(71) Applicant: VIVO MOBILE COMMUNICATION CO., LTD., Guangdong (CN)

(72) Inventor: Ming Zhou, Guangdong (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 486 days.

(21) Appl. No.: 17/747,057

(22) Filed: May 18, 2022

(65) Prior Publication Data

US 2022/0279116 A1    Sep. 1, 2022

Related U.S. Application Data

(63) Continuation of application No. PCT/CN2020/130782, filed on Nov. 23, 2020.

(30) Foreign Application Priority Data

Nov. 25, 2019 (CN) .......................... 201911167275.3

(51) Int. Cl.
*H04N 23/61* (2023.01)
*G06T 3/40* (2006.01)
(Continued)

(52) U.S. Cl.
CPC .............. *H04N 23/61* (2023.01); *G06T 3/40* (2013.01); *G06T 7/292* (2017.01); *G06V 10/255* (2022.01);
(Continued)

(58) Field of Classification Search
CPC ...... H04N 23/61; H04N 23/632; G06T 7/292; G06T 3/40; G06V 10/74; G06V 20/41; G06V 10/255
(Continued)

(56) References Cited

U.S. PATENT DOCUMENTS

2012/0121187 A1*   5/2012   Lee .................. G06F 16/587
                                                           715/764
2014/0226858 A1*   8/2014   Kang ................. H04N 23/675
                                                           382/103
(Continued)

FOREIGN PATENT DOCUMENTS

CN   102467574 A   5/2012
CN   103997598 A   8/2014
(Continued)

OTHER PUBLICATIONS

Supplementary European Search Report regarding European Patent Application No. 20893573.4-1208, dated Nov. 7, 2022.
(Continued)

*Primary Examiner* — William C Vaughn, Jr.
*Assistant Examiner* — Kristin Dobbs
(74) *Attorney, Agent, or Firm* — Harness, Dickey & Pierce, P.L.C.

(57) ABSTRACT

An object tracking method includes: acquiring a first image through a second camera in a case that a preview image acquired through a first camera is displayed, where the preview image and the first image include a plurality of objects, the plurality of objects are images of a plurality of first physical objects, and a resolution of the first image is greater than a resolution of the preview image; displaying, according to the first image and in the preview image, at least one identifier used for indicating M target object(s) in the plurality of objects in the preview image, M being a positive integer; receiving a first input for a first object in the M target object(s) in the preview image; and tracking a physical object corresponding to the first object and displaying an image of the physical object corresponding to the first object in response to the first input.

20 Claims, 6 Drawing Sheets

An electronic device acquires a first image through a second camera in a case that the electronic device displays a preview image acquired through a first camera — S201

The electronic device displays at least one identifier in the preview image according to the first image — S202

The electronic device receives a first input for a first object in M target object(s) in the preview image — S203

The electronic device tracks a physical object corresponding to the first object and displays an image of the physical object corresponding to the first object in response to the first input — S204

(51) Int. Cl.
*G06T 7/292* (2017.01)
*G06V 10/20* (2022.01)
*G06V 10/74* (2022.01)
*G06V 20/40* (2022.01)
*H04N 23/63* (2023.01)

(52) U.S. Cl.
CPC .............. *G06V 10/74* (2022.01); *G06V 20/41* (2022.01); *H04N 23/632* (2023.01)

(58) Field of Classification Search
USPC ......................................................... 348/169
See application file for complete search history.

(56) References Cited

U.S. PATENT DOCUMENTS

| | | | |
|---|---|---|---|
| 2014/0286543 A1 | 9/2014 | Nagaoka et al. | |
| 2017/0299842 A1* | 10/2017 | Posa | G02B 23/12 |
| 2018/0196472 A1 | 7/2018 | Lee | |
| 2020/0014961 A1 | 1/2020 | Ramaswamy et al. | |
| 2021/0084228 A1 | 3/2021 | Wang et al. | |

FOREIGN PATENT DOCUMENTS

| | | |
|---|---|---|
| CN | 106791400 A | 5/2017 |
| CN | 109495616 A | 3/2019 |
| CN | 109816694 A | 5/2019 |
| CN | 110072070 A | 7/2019 |
| CN | 110291775 A | 9/2019 |
| CN | 110301136 A | 10/2019 |
| CN | 110913132 A | 3/2020 |
| EP | 3937480 A1 | 1/2022 |

OTHER PUBLICATIONS

First Office Action regarding Indian Patent Application No. 202217035649, dated Nov. 25, 2022.
First Office Action regarding Japanese Patent Application No. 2022-526824, dated Jun. 16, 2023. Translation provided by Bohui Intellectual Property.
International Search Report and Written Opinion of the International Searching Authority regarding International Patent Application No. PCT/CN2020/130782, dated Feb. 18, 2021. Translation provided by Bohui Intellectual Property.
First Office Action regarding Chinese Patent Application No. 201911167275.3, dated Dec. 3, 2020. Translation provided by Bohui Intellectual Property.
Second Office Action regarding Chinese Patent Application No. 201911167275.3, dated Jul. 5, 2021. Translation provided by Bohui Intellectual Property.

* cited by examiner

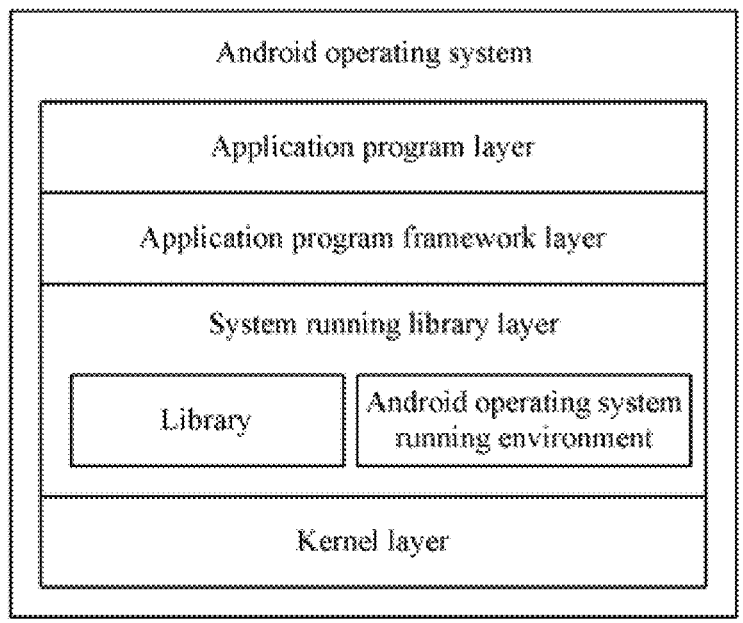

FIG. 1

An electronic device acquires a first image through a second camera in a case that the electronic device displays a preview image acquired through a first camera — S201

The electronic device displays at least one identifier in the preview image according to the first image — S202

The electronic device receives a first input for a first object in M target object(s) in the preview image — S203

The electronic device tracks a physical object corresponding to the first object and displays an image of the physical object corresponding to the first object in response to the first input — S204

FIG. 2

OBJECT TRACKING METHOD AND ELECTRONIC DEVICE

CROSS-REFERENCE TO RELATED APPLICATIONS

This application is a Bypass Continuation Application of PCT/CN2020/130782 filed on Nov. 23, 2020, which claims priority to Chinese Patent Application No. 201911167275.3 filed on Nov. 25, 2019, which are incorporated herein by reference in their entirety.

TECHNICAL FIELD

Embodiments of the present application relate to the field of communication technologies, and in particular, to an object tracking method and an electronic device.

BACKGROUND

With the continuous improvement of the intelligence degree of electronic devices, more functions can be provided by application programs in the electronic devices.

Currently, a user can track a target object by using a target tracking function in a camera application program, to perform high-dynamic range photographing or video recording on the target object. Specifically, if the user needs to perform high-dynamic-range photographing or video recording on the target object, the user may trigger the electronic device to start the camera application program and display a camera application interface. The user may then select the target object in a picture displayed in a preview region of the camera application interface, to trigger the electronic device to lock the target object, so as to perform high-dynamic-range photographing or video recording on the target object.

SUMMARY

According to a first aspect, the embodiments of the present application provide an object tracking method, applied to an electronic device, the method including: acquiring a first image through a second camera in a case that a preview image acquired through a first camera is displayed; displaying at least one identifier in the preview image according to the first image; receiving a first input for a first object in M target object(s) in the preview image; and tracking a physical object corresponding to the first object and displaying an image of the physical object corresponding to the first object in response to the first input. The preview image and the first image include a plurality of objects, the plurality of objects are images of a plurality of first physical objects, a resolution of the first image is greater than a resolution of the preview image, the at least one identifier is used for indicating the M target object(s) in the plurality of objects in the preview image, and M is a positive integer.

According to a second aspect, the embodiments of the present application provide an electronic device, including an acquisition module, a processing module, and a receiving module. The acquisition module is configured to acquire a first image through a second camera in a case that a preview image acquired through a first camera is displayed, where the preview image and the first image include a plurality of objects, the plurality of objects are images of a plurality of first physical objects, and a resolution of the first image is greater than a resolution of the preview image; the processing module is configured to display at least one identifier in the preview image according to the first image acquired by the acquisition module, where the at least one identifier is used for indicating M target object(s) in the plurality of objects in the preview image, and M is a positive integer; the receiving module is configured to receive a first input for a first object in the M target object(s) in the preview image displayed by the processing module; and the processing module is further configured to track a physical object corresponding to the first object and display an image of the physical object corresponding to the first object in response to the first input received by the receiving module.

According to a third aspect, the embodiments of the present application provide an electronic device, including a memory, a processor, and a computer program stored in the memory and executable on the processor, where when the computer program is executed by the processor, the steps of the object tracking method according to the first aspect are implemented.

According to a fourth aspect, the embodiments of the present application provide a non-transitory computer-readable storage medium, storing a computer program, where when the computer program is executed by a processor, the steps of the object tracking method according to the first aspect are implemented.

BRIEF DESCRIPTION OF THE DRAWINGS

FIG. 1 is a schematic architectural diagram of an Android operating system according to an embodiment of the present application;

FIG. 2 is a schematic diagram 1 of an object tracking method according to an embodiment of the present application;

DETAILED DESCRIPTION

Figure 3:
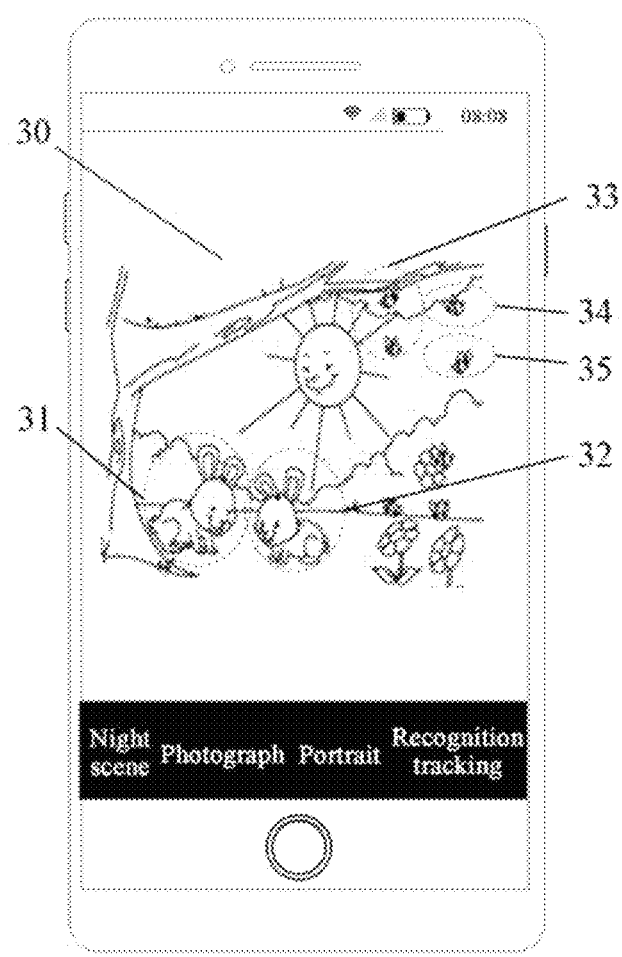
FIG. 3 is a schematic diagram 1 of an application interface of an object tracking method according to an embodiment of the present application.

The following clearly describes the technical solutions in the embodiments of the present application with reference to the accompanying drawings in the embodiments of the present application. Apparently, the described embodiments are some of the embodiments rather than all of the embodiments of the present application. All other embodiments obtained by a person of ordinary skill in the art based on the embodiments of the present application shall fall within the protection scope of this application.

The term "and/or" in this specification is only an association relationship for describing associated objects, and represents that three relationships may exist. For example, A and/or B may represent the following three cases: Only A exists, both A and B exist, and only B exists. In this specification, the symbol "/" represents an or relationship of the associated objects, and for example, A/B represents A or B.

In this application, the terms "first" and "second" and the like are intended to distinguish between different objects but do not indicate a particular order of the objects. For example, a first input and a second input are intended to distinguish between different inputs but do not indicate a particular order of the inputs.

In the embodiments of the present application, terms such as "exemplary" or "for example" are used for representing an example, an illustration, or an explanation. In the embodiments of the present application, any embodiment or design solution described as "exemplary" or "for example" should not be construed as more exemplary or having an advantage over other embodiments or design solutions.

In the description of the embodiments of the present application, unless stated otherwise, the meaning of "a plurality of" is two or more than two. For example, a plurality of elements refer to two or more than two elements.

At present, the process of performing high-dynamic range photographing or video recording on the target object is only applicable to a situation where the user can find the object in the picture displayed in the preview region. If the size of an object displayed in the picture is relatively small, the user cannot select the object in the picture, and therefore cannot trigger the electronic device to lock the object. As a result, the electronic device cannot perform high-dynamic-range photographing or video recording on the object.

The embodiments of the present application provide an object tracking method and an electronic device. In a case that the electronic device displays a preview image including a plurality of objects and acquired through a first camera, the electronic device may acquire a first image through a second camera (the first image also includes a plurality of objects, the plurality of objects are images of a plurality of first physical objects, and a resolution of the first image is greater than a resolution of the preview image). In addition, the electronic device may display, according to the first image, at least one identifier used for indicating M (M is a positive integer) target objects in the plurality of objects in the preview image in the preview image. Then, the electronic device may receive a first input for a first object in the M target object(s) in the preview image, and track a physical object corresponding to the first object and display an image of the physical object corresponding to the first object in response to the first input. According to this solution, in a case that the electronic device displays a preview image acquired through a camera, the electronic device may directly lock a physical object corresponding to a target object in the preview image according to a first image acquired through another camera, and the user does not need to select a target object in a picture displayed in the preview image to trigger the electronic device to lock the physical object corresponding to the target object. Therefore, even if the size of the target object displayed in the preview image is relatively small, namely, the user cannot select the target object in the preview image, the electronic device may still lock the physical object corresponding to the target object, to ensure that the electronic device may perform high-dynamic-range photographing or video recording on the physical object corresponding to the target object.

Optionally, in the embodiments of the present application, a focal length of the second camera is greater than a focal length of the first camera. That is, when the second camera is compared with the first camera, the second camera may be a telephoto camera, and the first camera may be a short-focus camera. For example, the first camera may be a wide-angle camera.

The electronic device in the embodiments of the present application may be an electronic device having an operating system. The operating system may be an Android operating system, an iOS operating system, or other possible operating systems, which is not limited in the embodiments of the present application.

The Android operating system is used as an example below to introduce a software environment to which the object tracking method provided in the embodiments of the present application is applied.

FIG. 1 is a schematic architectural diagram of a possible Android operating system according to an embodiment of the present application. In FIG. 1, an architecture of the Android operating system includes 4 layers, which are respectively an application program layer, an application program framework layer, a system running library layer, and a kernel layer (which may be a Linux kernel layer).

The application program layer includes various application programs (includes system application programs and third-party application programs) in the Android operating system.

The application program framework layer is a framework of application programs, and developers may develop some application programs based on the application program framework layer in a case of following development principles of the framework of application programs.

The system running library layer includes a library (also referred to as a system library) and an Android operating system running environment. The library mainly provides various resources required by the Android operating system. The Android operating system running environment is used for providing a software environment for the Android operating system.

The kernel layer is an operating system layer of the Android operating system and belongs to a software-level bottom layer of the Android operating system. The kernel layer provides, based on a Linux kernel, core system services and hardware-related drivers for the Android operating system.

The Android operating system is used as an example, in the embodiments of the present application, the developers may develop, based on the system architecture of the Android operating system shown in FIG. 1, a software program implementing the object tracking method provided in the embodiments of the present application, so that the object tracking method may be performed based on the Android operating system shown in FIG. 1. That is, a processor or an electronic device may implement the object tracking method provided in the embodiments of the present application by running the software program in the Android operating system.

The electronic device in the embodiments of the present application may be a mobile electronic device or may be a non-mobile electronic device. For example, the mobile electronic device may be a mobile phone, a tablet computer, a notebook computer, a palm computer, an in-vehicle terminal, a wearable device, an ultra-mobile personal computer (UMPC), a netbook, or a personal digital assistant (PDA); and the non-mobile electronic device may be a personal computer (PC), a television (TV), a teller machine, or an automated machine, which are not limited in the embodiments of the present application.

An execution entity of the object tracking method provided in the embodiments of the present application may be the foregoing electronic device or may be a functional module and/or a function entity that can implement the object tracking method in the electronic device, which may be determined according to an actual use requirement and is not limited in the embodiments of the present application. The object tracking method provided in the embodiments of the present application is exemplarily described below by using the electronic device as an example.

In the embodiments of the present application, for an electronic device provided with a plurality of cameras (for example, including the first camera and the second camera in the embodiments of the present application), if it is assumed that the first camera is a camera used by the electronic device by default, when the electronic device acquires images, the electronic device may preferentially acquire images by using the first camera. After the electronic device acquires a preview image of a region through the first camera, the electronic device may display the preview image in a preview region in a camera application interface. In addition, when the user needs to perform high-dynamic-range photographing or video recording on a physical object (for example, the physical object corresponding to the target object in the embodiments of the present application) in the region, if the user cannot know a position of the physical object in the region, namely, the user cannot select the target object in the preview image, the user may trigger (for example, trigger by triggering the electronic device to enter a recognition tracking mode) the electronic device to acquire an image of the region through the second camera, and the electronic device then may lock the physical object according to the image acquired through the second camera. In this way, even the size of the target object displayed in the preview image is relatively small, namely, the user cannot select the target object in the preview image, the electronic device may still lock the physical object corresponding to the target object, to ensure that the electronic device may perform high-dynamic-range photographing or video recording on the physical object corresponding to the target object.

The object tracking method provided in the embodiments of the present application is exemplarily described below with reference to accompanying drawings.

As shown in FIG. 2, the embodiments of the present application provide an object tracking method, and the method may include the following S201 to S204.

S201: An electronic device acquires a first image through a second camera in a case that the electronic device displays a preview image acquired through a first camera.

Optionally, in the embodiments of the present application, the foregoing preview image may be a preview image acquired by the electronic device through the first camera, and the preview image may be displayed in a preview region in a camera application interface.

It should be noted that, preview images in the embodiments of the present application all refer to images acquired by the electronic device through the first camera and displayed in the preview region of the camera application interface.

Optionally, in the embodiments of the present application, the electronic device may use a wide-angle camera to acquire images by default. That is, in normal cases, the electronic device may preferentially acquire images through a short-focus camera.

Optionally, in the embodiments of the present application, the preview image and the first image may include a plurality of objects, where the plurality of objects may be images of a plurality of first physical objects. That is, the preview image and the first image may be acquired images of a plurality of first physical objects in the same region, namely, a region where the first camera acquires the preview image and a region where the second camera acquires the first image may be the same region. Certainly, it may be understood that, the same region is merely a theoretical concept. During actual implementation, a deviation between two regions may be allowed (the deviation may be in an acceptable range).

It should be noted that, in the embodiments of the present application, even the region where the first camera acquires the preview image and the region where the second camera acquires the first image are the same, the first camera and the second camera have different focal lengths, so that the first image and the preview image may further include other different objects in addition to the plurality of objects, namely, in addition to the plurality of first physical objects, the same region may further include other different physical objects.

It may be understood that, in the embodiments of the present application, the objects in the preview image may be images of physical objects in a region corresponding to the preview image (namely, a region where the preview image is acquired) displayed in the preview image, and the objects in the first image may be images of physical objects in a region corresponding to the first image (namely, a region where the first image is acquired) displayed in the first image. Exemplarily, the preview image is used as an example, and a bee image in the preview image may be an image of a "bee" in a region corresponding to the preview image displayed in the preview image.

Optionally, in the embodiments of the present application, a resolution of the first image is greater than a resolution of the preview image.

It may be understood that, in a case that the focal length of the second camera is greater than the focal length of the first camera, for the same region, a resolution of an image of the region acquired through the second camera is greater than a resolution of an image of the region acquired through the first camera.

In the embodiments of the present application, when the user needs to perform high-dynamic-range photographing or video recording on a physical object, the user may first trigger the electronic device to run a camera application program, then trigger the electronic device to acquire an image of a region in which the physical object is located through the first camera, and then display the image (namely, the preview image) in the preview region of the camera application interface. The electronic device then may start the second camera, and acquire an image (namely, the first image) of the region in which the physical object is located through the second camera.

S202: The electronic device displays at least one identifier in the preview image according to the first image.

The at least one identifier may be used for indicating M target object(s) in the plurality of objects in the preview image. For example, each identifier in the at least one identifier may be used for indicating at least one target object in the M target object(s) in the preview image, and M is a positive integer.

It should be noted that, in the embodiments of the present application, physical objects corresponding to some target objects in the M target object(s) may be located in the same region (for example, a distance between the physical objects corresponding to these target objects is relatively small), and when the preview image is displayed on the electronic device, the size of the region displayed in the preview image is relatively small (for example, the user cannot identify these target objects in the preview image with naked eyes), so that the electronic device may display an identifier for these target objects, namely, the identifier may indicate these target objects.

Optionally, in the embodiments of the present application, when the electronic device displays the at least one identifier, the at least one identifier may be displayed in a region where the M target object(s) are located in the preview image. For example, the electronic device may display an identifier in a region where a target object or some target objects are located in the preview image, to indicate the target object or these target objects.

Optionally, in the embodiments of the present application, the foregoing S202 may be implemented through the following S202a and S202b.

S202a: The electronic device recognizes at least one object in the first image according to target attribute information, to obtain M target object(s) in the first image.

Attributes of physical objects corresponding to the M target object(s) in the first image may all belong to attributes indicated by the target attribute information.

For example, it is assumed that the target attribute information is an animal attribute (namely, indicating animals), the electronic device may recognize at least one object in the first image according to the animal attribute, to obtain all animal images in the first image, namely, obtain the M target object(s) in the first image, where a physical object corresponding to each target object in the M target object(s) belongs to the animal attribute. Alternatively, it is assumed that the target attribute information is a character attribute (namely, indicating characters), the electronic device may recognize the at least one object in the first image according to the character attribute, to obtain all character images in the first image, namely, obtain the M target object(s) in the first image, where a physical object corresponding to each target object in the M target object(s) belongs to the character attribute.

S202b: The electronic device displays at least one identifier in the preview image according to the M target object(s) in the first image.

In the embodiments of the present application, after the electronic device obtains the M target object(s) from the first image, the electronic device may display at least one identifier in the preview image according to the M target object(s) in the first image.

For example, it is assumed that the target attribute information is an animal attribute, FIG. 3 is a schematic diagram of an interface of a preview image displayed by the electronic device. After the electronic device recognizes the at least one object in the first image according to the animal attribute to obtain all animal images in the first image, the electronic device may display identifiers shown by 31 to 35 in FIG. 3 in the preview image (as shown by 30 in FIG. 3). The identifier 31 may indicate an animal image 1, the identifier 32 may indicate an animal image 2, the identifier 33 may indicate an animal image 3 and an animal image 4, the identifier 34 may indicate an animal image 5, and the identifier 35 may indicate an animal image 6. It may be understood that, an animal corresponding to the animal image 3 and an animal corresponding to the animal image 4 are in the same region, and sizes of the animal image 3 and the animal image 4 displayed in the preview image are relatively small, so that the electronic device may display an identifier 33 for the animal image 3 and the animal image 4.

Optionally, in the embodiments of the present application, the foregoing S202a may be implemented through the following S202a1 and S202a2.

S202a1: The electronic device obtains at least one template image from a template library according to the target attribute information.

Attributes of physical objects corresponding to objects in the at least one template image all belong to the attributes indicated by the target attribute information.

For example, it is assumed that the target attribute information is an animal attribute, the electronic device may obtain at least one template image where objects in the template image belong to the animal attribute from the template library, namely, attributes of physical objects corresponding to the objects in the at least one template image all belong to the animal attribute.

Optionally, in the embodiments of the present application, in a case that the electronic device establishes a connection with a server, the electronic device may obtain the at least one template image from a template library of the server. In a case that the electronic device does not establish a connection with a server, the electronic device may obtain the at least one template image from a template library of the electronic device. Template images in the template library of the server and template images in the template library of the electronic device are all template images that are pre-stored.

S202a2: The electronic device matches the first image with the at least one template image, to recognize the at least one object in the first image.

In the embodiments of the present application, after the electronic device obtains the at least one template image, the electronic device may match the first image with the at least one template image, to recognize the at least one object in the first image.

Optionally, in the embodiments of the present application, the electronic device may recognize the at least one object in the first image by matching feature points corresponding to the first image with feature points corresponding to the at least one template image. For example, the electronic device may first extract the feature points corresponding to the first image from the first image, and extract feature points corresponding to each template image in the at least one template image from the at least one template image. The electronic device may then match the feature points corresponding to the first image with the feature points corresponding to each template image to recognize the at least one object in the first image.

In the embodiments of the present application, the electronic device may recognize the at least one object in the first image according to the feature points corresponding to the first image and the feature points corresponding to each template image in the obtained at least one template image, so that the electronic device can accurately recognize the at least one object in the first image, to accurately recognize objects of the attribute that the user needs to recognize in the first image.

S203: The electronic device receives a first input for a first object in the M target object(s) in the preview image.

In the embodiments of the present application, the first input may be used for the user to determine the first object, namely, the user may trigger, according to the first input, the electronic device to determine the first object.

Optionally, in the embodiments of the present application, the first input may be an input by the user for the first object, or the first input may be an input by the user for an identifier indicating the first object. The first input may be determined according to an actual use requirement, which is not limited in the embodiments of the present application.

For example, in the embodiments of the present application, in a case that each identifier in the at least one identifier indicates an object, the first input may be an input by the user for the first object, or may be an input by the user for the identifier indicating the first object. In a case that an identifier in the at least one identifier indicating a plurality of objects, in a possible implementation, the electronic device may first perform an input for the identifier, to trigger the electronic device to display the plurality of objects indicated by the identifier, and the user may then perform the first input for a first object in the plurality of objects (in this case, the first object is one object). In another possible implementation, the electronic device may directly perform the first input for the identifier (in this case, the first object includes a plurality of objects).

Optionally, in the embodiments of the present application, the first input may be an input in any possible form such as a click input, a long press input, or a press input. The first input may be determined according to an actual use requirement, which is not limited in the embodiments of the present application.

The click input may be a single click input, a double click input, or an input with a preset quantity of click times. The long press input may be an input pressed for a duration greater than or equal to a time threshold by the user on the first object or the identifier indicating the first object. The press input may be an input pressed with a pressure value greater than or equal to a pressure threshold by the user on the first object or the identifier indicating the first object.

Optionally, in the embodiments of the present application, the preset quantity of times, the time threshold, and the pressure threshold may be values pre-configured in the electronic device, and the preset quantity of times, the time threshold, and the pressure threshold may be pre-configured in the electronic device by a manufacturer of the electronic device. The preset quantity of times, the time threshold, and the pressure threshold may be determined according to an actual use requirement, which are not limited in the embodiments of the present application.

S204: The electronic device tracks a physical object corresponding to the first object and displays an image of the physical object corresponding to the first object in response to the first input.

In the embodiments of the present application, after the electronic device receives the first input by the user for the first object in the M target object(s) in the preview image, the electronic device may track a physical object corresponding to the first object and display an image of the physical object corresponding to the first object in response to the first input. For example, the electronic device may acquire the image of the physical object corresponding to the first object in real time through the second camera, namely, track the physical object corresponding to the first object through the second camera. That is, tracking photographing is performed on the physical object corresponding to the first object, and an image obtained through tracking photographing is updated and displayed in real time. In this way, the electronic device can perform high-dynamic-range photographing or video recording on the physical object corresponding to the first object through the camera application program.

Optionally, in the embodiments of the present application, the electronic device may display an image of the first object in the preview region. That is, the electronic device may update the preview image acquired through the first camera in the preview region to the image of the physical object corresponding to the first object acquired through the second camera.

Figure 4:
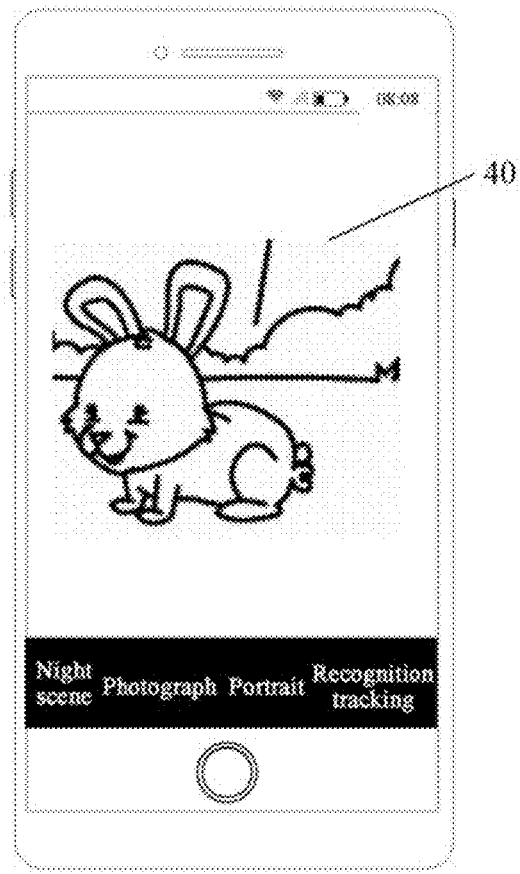
FIG. 4 is a schematic diagram 2 of an application interface of an object tracking method according to an embodiment of the present application.

For example, with reference to FIG. 3, after the electronic device displays the identifiers shown by 31 to 35 in FIG. 3 in the preview image, it is assumed that the first object is the object indicated by the identifier 32 in FIG. 3. After the user clicks the identifier 32, namely, after the electronic device receives the first input by the user, the electronic device responds to the first input, and as shown in FIG. 4, the electronic device may update the preview image 30 displayed in the preview region to an image of the object indicated by the identifier 32 (as shown by 40 in FIG. 4).

In the embodiments of the present application, the electronic device may directly lock the target object according to the first image acquired through the second camera, and the user does not need to select the target object in the picture displayed in the preview image to trigger the electronic device to lock the target object. Therefore, it can be ensured that: even in a case that the size of the target object displayed in the preview image is relatively small, namely, the user cannot select the target object in the picture, the electronic device may still lock target object, thereby ensuring that the electronic device may perform high-dynamic-range photographing or video recording on the target object.

Optionally, in the embodiments of the present application, the foregoing S204 may be implemented through the following S204a to S204c.

S204a: The electronic device displays a second image in response to the first input.

The second image may include the first object displayed in an enlarged manner, where the first object displayed in an enlarged manner may be a first object in an image (for example, the first image) acquired through the second camera, or may be an object obtained by enlarging the first object in the preview image acquired through the first camera.

In the embodiments of the present application, after the electronic device receives the first input by the user for the first object in the M target object(s), the electronic device may first enlarge and display an image including the first object in response to the first input, namely, the electronic device displays the second image, and the user may then perform an input (for example, the following second input) for the second image, to track the physical object corresponding to the first object and display the image of the physical object corresponding to the first object.

Optionally, in the embodiments of the present application, the electronic device may display the second image at any position in the preview image, and an area of the preview image covered by the second image may be arbitrarily set according to an actual requirement, which are not limited in the embodiments of the present application.

S204b: The electronic device receives a second input for the second image.

In the embodiments of the present application, after the electronic device displays the second image, if the user needs to perform high-dynamic-range photographing or video recording on the first object, the user may perform a second input for the second image, to trigger the electronic device to perform tracking photographing on the physical object corresponding to the first object.

It should be noted that, in the embodiments of the present application, if the user does not need to perform high-dynamic-range photographing or video recording on the first object, the user may perform a fifth input for the second image, to trigger the electronic device to cancel the display of the second image. After the electronic device cancels the display of the second image, the electronic device may continue to perform S202 to display a preview image including at least one identifier.

Optionally, the user may continue to trigger the electronic device to perform S203 in the object tracking method provided in the embodiments of the present application, to determine another object in the preview image again.

Optionally, in the embodiments of the present application, input forms of the second input and the fifth input are different. For example, the second input may be a single click input by the user on the second image, and the fifth input may be a double click input by the user on the second image. For example, the input forms of the second input and the fifth input may be determined according to an actual use requirement, provided that the input forms of the second input and the fifth input are different.

S204c: The electronic device tracks the physical object corresponding to the first object and displays the image of the physical object corresponding to the first object in response to the second input.

In the embodiments of the present application, after the electronic device receives the second input by the user for the second image, the electronic device may track the physical object corresponding to the first object and display the image of the physical object corresponding to the first object in response to the second input.

In the embodiments of the present application, before tracking the first object and displaying the image of the first object, the electronic device may first display the image of the first object in an enlarged manner, so that the user may view the first object, to determine whether the physical object corresponding to the first object is a physical object on which the user needs to perform high-dynamic-range photographing or video recording. Therefore, the electronic device can accurately track and photograph the physical object that the user needs to photograph.

Optionally, after the electronic device displays the image of the first object in an enlarged manner, the electronic device only tracks the physical object corresponding to the first object and displays the image of the physical object corresponding to the first object after receiving the second input by the user, so that the electronic device may be prevented from performing unnecessary track and display operations, thereby reducing power consumption of the electronic device.

Optionally, in the embodiments of the present application, in a case that the electronic device displays the preview image acquired through the first camera, if the user needs to perform high-dynamic-range photographing or video recording on a physical object corresponding to a target object in the preview image, the user may trigger, through an input (for example, the following third input), the electronic device to be in a recognition tracking mode, and the electronic device may acquire the first image through the second camera in the recognition tracking mode.

Figure 5:
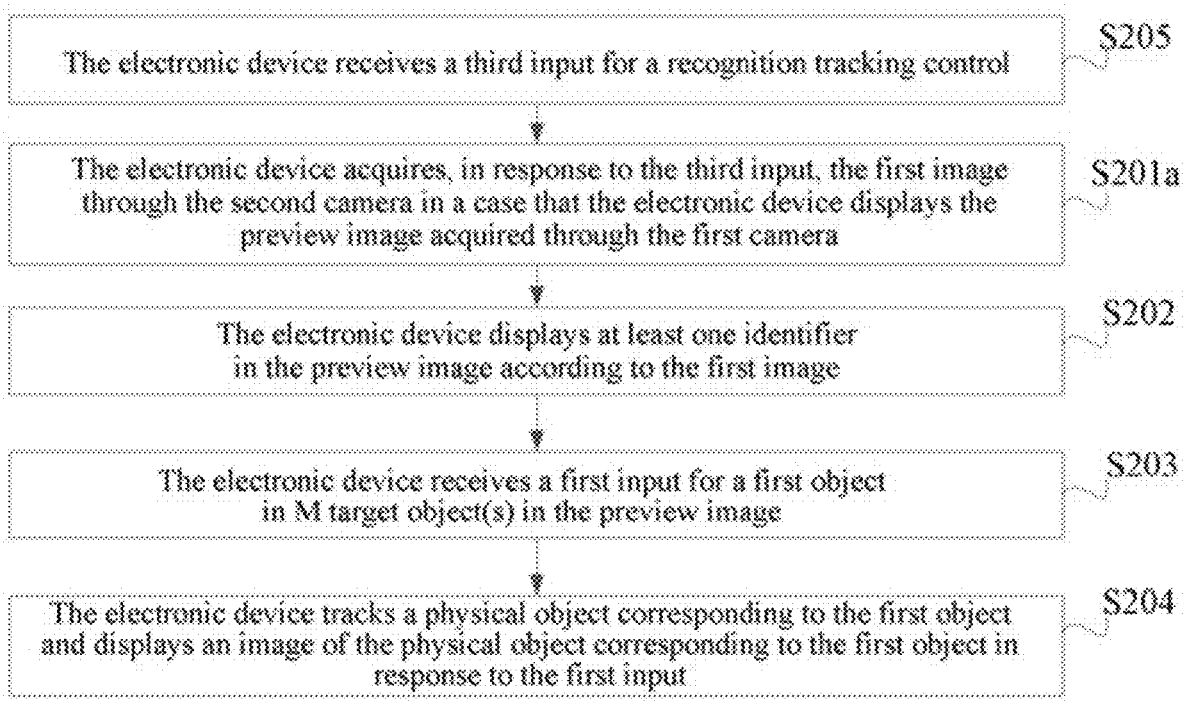
FIG. 5 is a schematic diagram 2 of an object tracking method according to an embodiment of the present application.

For example, with reference to FIG. 2, as shown in FIG. 5, before S201, the object tracking method provided in the embodiments of the present application may further include the following S205. In addition, the foregoing S201 may be implemented through the following S201a.

S205: The electronic device receives a third input for a recognition tracking control.

Optionally, in the embodiments of the present application, after the user triggers the electronic device to run the camera application program, the camera application interface may display at least one control (each control may be used for indicating a mode). The at least one control may include a recognition tracking control, and the recognition tracking control may be used for indicating the recognition tracking mode. For example, in the recognition tracking mode, the electronic device may recognize some objects and track physical objects corresponding to the objects through the second camera, namely, perform tracking photographing on the physical objects corresponding to the objects, and update and display an image obtained through tracking photographing in real time.

Optionally, in the embodiments of the present application, the at least one control may further include other possible controls such as a night scene control, a photograph control, and a portrait control. The night scene control may be used for indicating a night scene mode, the photograph control may be used for indicating a photographing mode, and the portrait control may be used for indicating a portrait mode. In the night scene mode, the electronic device may perform an operation of photographing a night scene; in the photographing mode, the electronic device may perform an operation of taking a normal photo; and in the portrait mode, the electronic device may perform an operation of photographing a portrait.

Optionally, in the embodiments of the present application, the third input may be a click input, a long press input, or a press input by the user on the recognition tracking control, or may be a voice input by the user, or may be any possible input such as a gesture input by the user, which is not limited in the embodiments of the present application.

For example, the voice input may be any possible voice input such as "recognition tracking" spoken by the user. The gesture input may be a gesture input the same as a preset gesture input (it may be understood that, the preset gesture input may be a gesture input preset in the embodiments of the present application to realize acquisition of the first image through the second camera).

S201a: The electronic device acquires, in response to the third input, the first image through the second camera in a case that the electronic device displays the preview image acquired through the first camera.

In the embodiments of the present application, in a case that the electronic device displays the preview image acquired through the first camera and the electronic device receives the third input by the user for the recognition tracking control, the electronic device may acquire the first image through the second camera in response to the third input.

Optionally, in the embodiments of the present application, after the electronic device receives the third input by the user for the recognition tracking control, the electronic device may control, in response to the third input, the camera application program of the electronic device to be in the recognition tracking mode. It may be understood that, after the electronic device receives the third input by the user for the recognition tracking control, the electronic device may control the camera application program to be in the recognition tracking mode.

Optionally, in a case that the electronic device displays the preview image acquired through the first camera and the electronic device receives the third input by the user for the recognition tracking control, the electronic device may, in response to the third input, control the camera application program of the electronic device to be in the recognition tracking mode, and acquire the first image through the second camera.

It should be noted that, after the user performs the third input for the recognition tracking control (that is, the camera application program is in the recognition tracking mode), if the electronic device displays the preview image acquired through the first camera, the electronic device may automatically acquire the first image through the second camera. When the camera application program is not in the recognition tracking mode, even the electronic device displays the preview image acquired through the first camera, the electronic device may not acquire the first image through the second camera.

In the embodiments of the present application, in a case that the camera application program is in the recognition tracking mode, the electronic device may automatically acquire the first image through the second camera, and the second camera may be a telephoto camera, so that a resolution of the first image acquired by the electronic device is relatively high, and a success rate of the electronic device recognizing the objects in the first image is relatively high. In this way, the electronic device may accurately recognize the target object in the first image.

Optionally, only in a case that the camera application program is in the recognition tracking mode, the electronic device acquires the first image through the second camera, namely, the electronic device may not acquire the first image through the second camera in a case that the camera application program is not in the recognition tracking mode, so that the electronic device may be prevented from performing unnecessary acquisition operations, thereby reducing the power consumption of the electronic device.

Optionally, in the embodiments of the present application, before the electronic device recognizes the at least one object in the first image according to the target attribute information, the electronic device may further display at least one attribute option first, and the user may then select a target attribute option from the at least one attribute option. Therefore, the electronic device may recognize the at least one object in the first image according to target attribute information indicated by the target attribute option, to obtain target objects corresponding to the target attribute information.

For example, before the foregoing S202a, the object tracking method provided in the embodiments of the present application may further include the following S206 and S207, and the foregoing S202a may be implemented through the following S202a3.

S206: The electronic device displays at least one attribute option.

Each attribute option in the at least one attribute option may be used for indicating one piece of attribute information.

Optionally, in the embodiments of the present application, the at least one attribute option may include any possible attribute option such as an animal option, a plant option, a character option, and an electronic device option. The at least one attribute option may be set according to an actual use requirement, which is not limited in the embodiments of the present application.

In the embodiments of the present application, after the user selects the recognition tracking control from the at least one control, namely, after the electronic device receives the third input by the user, the electronic device may, in response to the third input, not only control the electronic device to be in the recognition tracking mode, but also display at least one attribute option.

Figure 6A:
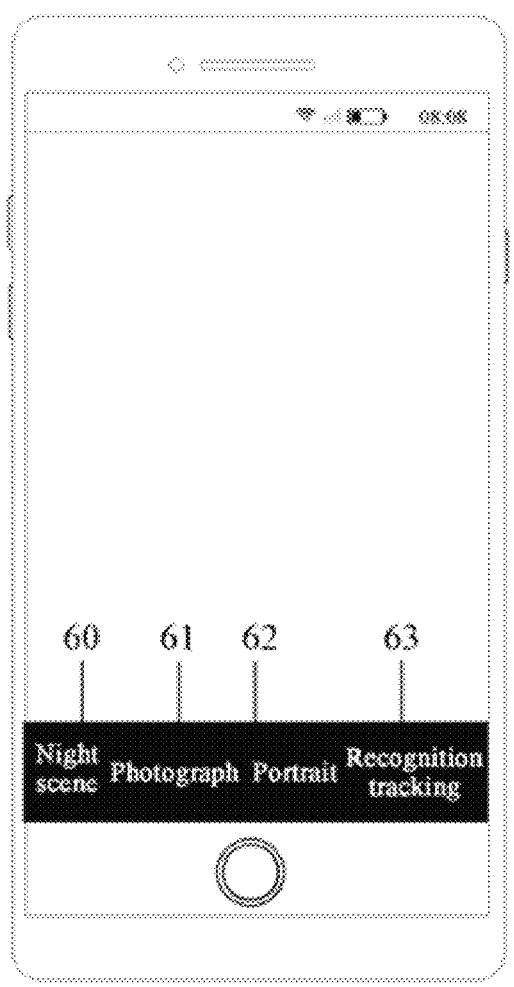
FIG. 6A is a schematic diagram 3 of an application interface of an object tracking method according to an embodiment of the present application.
Figure 6B:
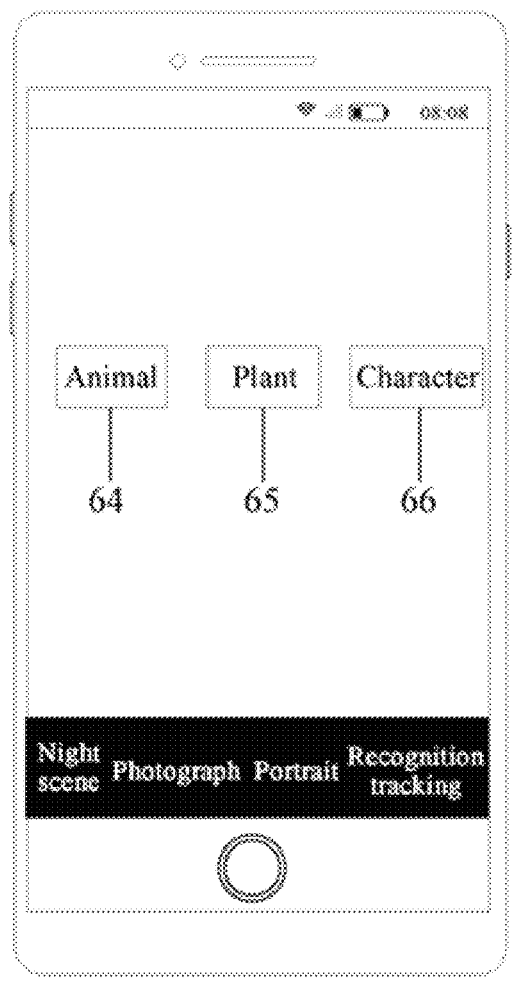
FIG. 6B is a schematic diagram 4 of an application interface of an object tracking method according to an embodiment of the present application.

For example, it is assumed that the at least one attribute option includes an animal option, a plant option, and a character option. FIG. 6A is a schematic diagram of a camera application interface displayed by the electronic device. The interface includes a night scene control (as shown by 60 in FIG. 6A), a photograph control (as shown by 61 in FIG. 6A), a portrait control (as shown by 62 in FIG. 6A), and a recognition tracking control (as shown by 63 in FIG. 6A). After the user clicks the recognition tracking control 63, namely, after the electronic device receives the third input by the user, the electronic device responds to the third input. As shown in FIG. 6B, the electronic device may control the camera application program to be in a recognition tracking mode (the recognition tracking control is displayed in a bold and enlarged manner in the figure to indicate that the camera application program has been in the recognition tracking mode), and display an animal option (as shown by 64 in FIG. 6B), a plant option (as shown by 65 in FIG. 6B), and a character option (as shown by 66 in FIG. 6B).

S207: The electronic device receives a fourth input for a target attribute option in the at least one attribute option.

The target attribute option may be used for indicating the target attribute information.

In the embodiments of the present application, the fourth input may be used for determining the target attribute information. That is, the user may perform the fourth input for the target attribute option in the at least one attribute option, to trigger the electronic device to determine the target attribute information.

Optionally, in the embodiments of the present application, the fourth input may be an input by the user on the target attribute option. The fourth input may be an input in any possible form such as a click input, a long press input, or a press input by the user on the target attribute option. The fourth input may be determined according to an actual use requirement, which is not limited in the embodiments of the present application.

For description of the click input, the long press input, or the press input, reference may be made to related description of the click input, the long press input, or the press input in the foregoing embodiments, and details are not described herein again to avoid repetition.

S202a3: The electronic device recognizes, in response to the fourth input, the at least one object in the first image according to the target attribute information indicated by the target attribute option, to obtain the M target object(s) in the first image.

In the embodiments of the present application, after the electronic device receives the fourth input by the user for the target attribute option in the at least one attribute option, the electronic device may recognize, in response to the fourth input, the at least one object in the first image according to the target attribute information indicated by the target attribute option, to obtain the M target object(s) in the first image.

It should be noted that, for description of recognizing the at least one object in the first image according to the target attribute information, reference may be made to the description of the foregoing S202a1 and S202a2, and details are not described herein again to avoid repetition.

In the embodiments of the present application, the user may select an attribute option according to an actual use requirement, so that the electronic device may accurately recognize objects corresponding to attribute information indicated by the attribute option in the first image, that is, the electronic device may accurately recognize the objects that the user needs to recognize, thereby preventing the electronic device from recognizing other objects that the user does not need to recognize.

It should be noted that, in the embodiments of the present application, the object tracking methods shown in the foregoing method accompanying drawings are all exemplarily described with reference to one accompanying drawings in the embodiments of the present application. In an implementation, the object tracking methods shown in the foregoing method accompanying drawings may be alternatively implemented with reference to any other accompanying drawing in the foregoing embodiments, and details are not described herein again.

Figure 7:
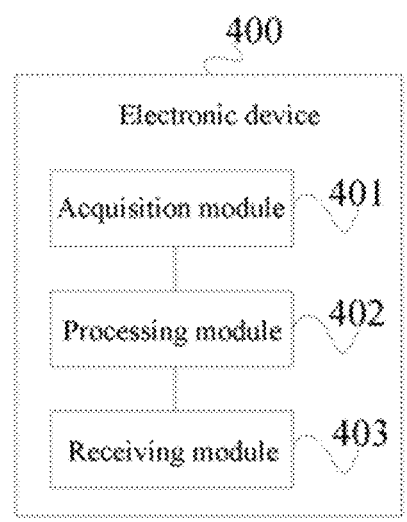
FIG. 7 is a schematic structural diagram of an electronic device according to an embodiment of the present application.

As shown in FIG. 7, the embodiments of the present application provide an electronic device 400, and the electronic device 400 may include an acquisition module 401, a processing module 402, and a receiving module 403. The acquisition module 401 may be configured to acquire a first image through a second camera in a case that a preview image acquired through a first camera is displayed, where the preview image and the first image include a plurality of objects, the plurality of objects may be images of a plurality of first physical objects, and a resolution of the first image is greater than a resolution of the preview image; the processing module 402 may be configured to display at least one identifier in the preview image according to the first image acquired by the acquisition module 401, where the at least one identifier may be used for indicating M target object(s) in the plurality of objects in the preview image, and M is a positive integer; the receiving module 403 may be configured to receive a first input for a first object in the M target object(s) in the preview image displayed by the processing module 402; and the processing module 402 may be further configured to track a physical object corresponding to the first object and display an image of the physical object corresponding to the first object in response to the first input received by the receiving module 403.

Optionally, in the embodiments of the present application, the processing module 402 may be configured to display a second image in response to the first input; receive a second input by a user for the second image; and track the physical object corresponding to the first object and display the image of the physical object corresponding to the first object in response to the second input, where the second image may include the first object displayed in an enlarged manner.

Optionally, in the embodiments of the present application, the receiving module 403 may be further configured to receive a third input for a recognition tracking control before the first image is acquired by the acquisition module 401 through the second camera; and the acquisition module 401 may be configured to acquire the first image through the second camera in response to the third input received by the receiving module 403.

Optionally, in the embodiments of the present application, the processing module 402 may be configured to recognize at least one object in the first image according to target attribute information, to obtain M target object(s) in the first image; and display the at least one identifier in the preview image according to the M target object(s) in the first image, where attributes of physical objects corresponding to the M target object(s) in the first image may all belong to attributes indicated by the target attribute information.

Optionally, in the embodiments of the present application, the processing module 402 may be further configured to display at least one attribute option before recognizing the at least one object in the first image according to the target attribute information, where each attribute option is used for indicating one piece of attribute information; the receiving module 403 may be further configured to receive a fourth input for a target attribute option in the at least one attribute option displayed by the processing module 402; and the processing module 402 may be configured to recognize, in response to the fourth input received by the receiving module 403, the at least one object in the first image according to target attribute information indicated by the target attribute option.

Optionally, in the embodiments of the present application, the processing module 402 may be configured to obtain at least one template image from a template library according to the target attribute information; and match the first image with the at least one template image, to recognize the at least one object in the first image, where attributes of physical objects corresponding to objects in the at least one template image may all belong to the attributes indicated by the target attribute information.

Optionally, in the embodiments of the present application, a focal length of the second camera is greater than a focal length of the first camera.

The electronic device provided in the embodiments of the present application may implement processes implemented by the electronic device in the foregoing method embodiments, and details are not described herein again to avoid repetition.

The embodiments of the present application provide an electronic device. In a case that the electronic device displays a preview image including a plurality of objects and acquired through a first camera, the electronic device may acquire a first image through a second camera (the first image also includes a plurality of objects, the plurality of objects are images of a plurality of first physical objects, and a resolution of the first image is greater than a resolution of the preview image). In addition, the electronic device may display, according to the first image, at least one identifier used for indicating M (M is a positive integer) target objects in the plurality of objects in the preview image in the preview image. Then, the electronic device may receive a first input for a first object in the M target object(s) in the preview image, and track a physical object corresponding to the first object and display an image of the physical object corresponding to the first object in response to the first input. According to this solution, in a case that the electronic device displays a preview image acquired through a camera, the electronic device may directly lock a physical object corresponding to a target object in the preview image according to a first image acquired through another camera, and the user does not need to select a target object in a picture displayed in the preview image to trigger the electronic device to lock the physical object corresponding to the target object in the preview image. Therefore, even in a case that the size of the target object displayed in the preview image is relatively small, namely, the user cannot select the target object in the preview image, the electronic device may still lock the physical object corresponding to the target object, to ensure that the electronic device may perform high-dynamic-range photographing or video recording on the physical object corresponding to the target object.

Figure 8:
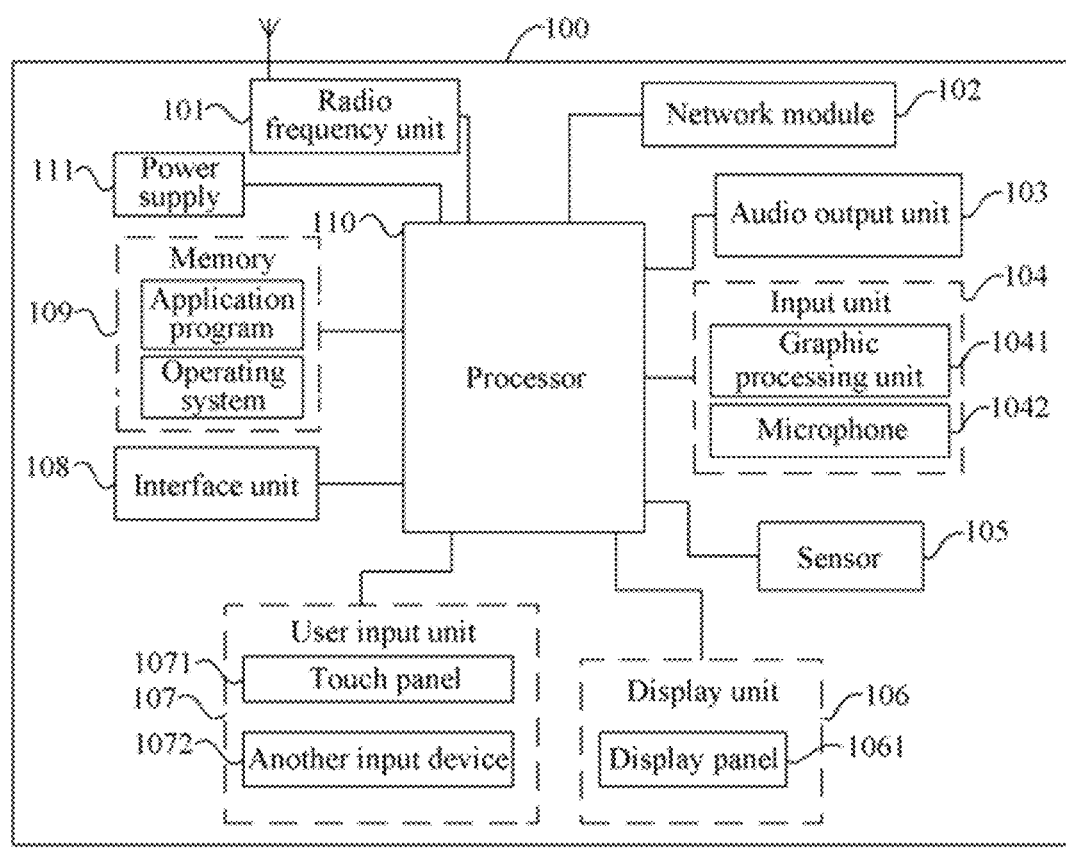
FIG. 8 is a schematic diagram of hardware of an electronic device according to an embodiment of the present application.

FIG. 8 is a schematic diagram of hardware of an electronic device implement the embodiments of the present application. As shown in FIG. 8, the electronic device 100 includes, but not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the electronic device structure shown in FIG. 8 does not constitute a limitation to the electronic device. The electronic device may include more or fewer components than those shown in the figure, or some components may be combined, or a different component deployment may be used. In the embodiments of the present application, the electronic device includes, but not limited to, a mobile phone, a tablet computer, a notebook computer, a palm computer, an in-vehicle terminal, a wearable device, and a pedometer.

The processor 110 may be configured to acquire a first image through a second camera in a case that the display unit 106 displays a preview image acquired through a first camera; display at least one identifier in the preview image according to the first image; control the user input unit 107 to receive a first input for a first object in M target object(s) in the preview image; and track a physical object corresponding to the first object and display an image of the physical object corresponding to the first object in response to the first input. The preview image and the first image include a plurality of objects, the plurality of objects are images of a plurality of first physical objects, and a resolution of the first image is greater than a resolution of the preview image; and the at least one identifier is used for indicating M target object(s) in the plurality of objects in the preview image, and M is a positive integer.

The embodiments of the present application provide an electronic device. In a case that the electronic device displays a preview image including a plurality of objects and acquired through a first camera, the electronic device may acquire a first image through a second camera (the first image also includes a plurality of objects, the plurality of objects are images of a plurality of first physical objects, and a resolution of the first image is greater than a resolution of the preview image). In addition, the electronic device may display, according to the first image, at least one identifier used for indicating M (M is a positive integer) target objects in the plurality of objects in the preview image in the preview image. Then, the electronic device may receive a first input for a first object in the M target object(s) in the preview image, and track a physical object corresponding to the first object and display an image of the physical object corresponding to the first object in response to the first input. According to this solution, in a case that the electronic device displays a preview image acquired through a camera, the electronic device may directly lock a physical object corresponding to a target object in the preview image according to a first image acquired through another camera, and the user does not need to select a target object in a picture displayed in the preview image to trigger the electronic device to lock the physical object corresponding to the target object in the preview image. Therefore, even in a case that the size of the target object displayed in the preview image is relatively small, namely, the user cannot select the target object in the preview image, the electronic device may still lock the physical object corresponding to the target object, to ensure that the electronic device may perform high-dynamic-range photographing or video recording on the physical object corresponding to the target object.

It should be understood that, in the embodiments of the present application, the radio frequency circuit 101 may be configured to receive and send signals in an information receiving and sending process or a call process, for example, after downlink data of a base station is received, send the downlink data to the processor 110 for processing. In addition, the radio frequency unit transmits uplink data to the base station. Generally, the radio frequency unit 101 includes, but not limited to, an antenna, at least one amplifier, a transceiver, a coupler, a low noise amplifier, a duplexer, and the like. In addition, the radio frequency unit 101 may further communicate with a network and another device through a wireless communication system.

The electronic device provides wireless broadband Internet access for the user through the network module 102, for example, to help the user to receive and send an email, browse a webpage, and access stream media.

The audio output unit 103 may convert audio data received by the radio frequency unit 101 or the network module 102 or stored in the memory 109 into audio signals and output the audio signals as voice. In addition, the audio output unit 103 may further provide audio outputs (for example, call signal receiving voice and message receiving voice) related to specific functions executed by the electronic device 100. The audio output unit 103 includes a speaker, a buzzer, and a telephone receiver, and the like.

The input unit 104 is configured to receive audio or video signals. The input unit 104 may include a graphic processing unit (GPU) 1041 and a microphone 1042, and the GPU 1041 processes static pictures or video image data obtained by an image capturing device (such as a camera) in a video capturing mode or an image capturing mode. A processed image frame may be displayed on the display unit 106. The image frame processed by the GPU 1041 may be stored in the memory 109 or transmitted through the radio frequency unit 101 or the network module 102. The microphone 1042 may receive voice and process the voice into audio data. The processed audio data may be converted, in a mobile phone calling mode, into an output in a form that can be transmitted to a mobile communication base station by the radio frequency unit 101.

The electronic device 100 further includes at least one sensor 105, such as an optical sensor, a motion sensor, and other sensors. For example, the optical sensor includes an ambient light sensor and a proximity sensor. The ambient light sensor may adjust luminance of a display panel 1061 according to brightness of the ambient light. The proximity sensor may switch off the display panel 1061 and/or backlight when the electronic device 100 is moved to the ear. As one type of the motion sensor, an acceleration sensor may detect a magnitude of acceleration in various directions (generally three axes), and may detect a magnitude and a direction of gravity when static, which may be configured to recognize postures of the electronic device (such as switching between landscape orientation and portrait orientation, related games, and magnetometer posture calibration), vibration recognition related functions (such as pedometer and tap), and the like. The sensor 105 may further include a fingerprint sensor, a pressure sensor, an iris sensor, a molecular sensor, a gyroscope, a barometer, a hygrometer, a thermometer, and an infrared sensor, and details are not described herein again.

The display unit 106 is configured to display information inputted by the user or information provided for the user. The display unit 106 may include a display panel 1061. Optionally, the display panel 1061 may be configured by using a liquid crystal display (LCD), an organic light-emitting diode (OLED), or the like.

The user input unit 107 may be configured to receive inputted digit or character information, and generate a keyboard signal input related to the user setting and function control of the electronic device. For example, the user input unit 107 includes a touch panel 1071 and another input device 1072. The touch panel 1071, also referred to as a touch screen, may collect a touch operation of a user on or near the touch panel (such as an operation of a user on or near the touch panel 1071 by using any suitable object or attachment, such as a finger or a stylus). The touch panel 1071 may include two parts: a touch detection apparatus and a touch controller. The touch detection apparatus detects a touch orientation by the user, detects a signal brought by the touch operation, and transmits the signal to the touch controller. The touch controller receives touch information from the touch detection apparatus, converts the touch information into contact coordinates, then transmits the contact coordinates to the processor 110, and receives and executes a command transmitted by the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. For example, the another input device 1072 may include, but not limited to, a physical keyboard, a function key (such as a volume control key or a switch key), a track ball, a mouse, and a joystick, which is not described herein again.

Optionally, the touch panel 1071 may cover the display panel 1061. After detecting a touch operation on or near the touch panel 1071, the touch panel transmits the touch operation to the processor 110, to determine a type of a touch event. Then, the processor 110 provides a corresponding visual output on the display panel 1061 according to the type of the touch event. Although in FIG. 8, the touch panel 1071 and the display panel 1061 are used as two separate parts to implement input and output functions of the electronic device, in some embodiments, the touch panel 1071 and the display panel 1061 may be integrated to implement the input and output functions of the electronic device, which is not limited herein.

The interface unit 108 is an interface through which an external device is connected to the electronic device 100. For example, the external device may include a wired or wireless headphone port, an external power supply (or a battery charger) port, a wired or wireless data port, a memory card port, a port configured to connect to a device with a recognition module, an audio input/output (I/O) port, a video I/O port, and an earphone port. The interface unit 108 may be configured to receive an input (for example, data information or electricity) from an external device and transmit the received input to one or more elements in the electronic device 100, or may be configured to transmit data between the electronic device 100 and the external device.

The memory 109 may be configured to store a software program and various data. The memory 109 may mainly include a program storage area and a data storage area. The program storage area may store an operating system, an application program required by at least one function (for example, a sound playback function and an image playback function), or the like. The data storage area may store data (for example, audio data and a phone book) created according to the use of the mobile phone. In addition, the memory 109 may include a high speed random access memory, and may further include a non-volatile memory, such as at least one magnetic disk storage device, a flash memory device or other non-volatile solid state storage devices.

The processor 110 is a control center of the electronic device, and connects various parts of the entire electronic device by using various interfaces and lines. By running or executing a software program and/or a module stored in the memory 109, and invoking data stored in the memory 109, the processor performs various functions of the electronic device and processes data, thereby performing overall monitoring on the electronic device. The processor 110 may include one or more processing units. Optionally, the processor 110 may integrate an application processor and a modem processor, where the application processor mainly processes an operating system, a user interface, an application program, and the like, and the modem processor mainly processes wireless communication. It may be understood that the foregoing modem may either not be integrated into the processor 110.

The electronic device 100 further includes the power supply 111 (such as a battery) for supplying power to the components. Optionally, the power supply 111 may be logically connected to the processor 110 by using a power supply management system, thereby implementing functions, such as charging, discharging, and power consumption management, by using the power supply management system.

In addition, the electronic device 100 includes some functional modules that are not shown, which are not described herein.

Optionally, the embodiments of the present application further provide an electronic device. As shown in FIG. 8, the electronic device includes a processor 110, a memory 109, and a computer program stored in the memory 109 and executable on the processor 110. The computer program, when executed by the processor 110, implements the processes of the foregoing method embodiments, and can achieve the same technical effects, which is not described herein again to avoid repetition.

The embodiments of the present application further provide a non-transitory computer-readable storage medium, storing a computer program, the computer program, when executed by a processor, implementing the processes of the foregoing method embodiments and achieving the same technical effects, which is not described herein again to avoid repetition. The non-transitory computer-readable storage medium may include: a read-only memory (ROM), a random access memory (RAM), a magnetic disk, or an optical disc.

It should be noted that, the terms "include", "comprise", or any other variation thereof in this specification are intended to cover a non-exclusive inclusion, so that a process, a method, an article, or an apparatus that includes a series of elements not only includes these elements, but also includes other elements not expressly listed, or further includes elements inherent to this process, method, article, or apparatus. An element limited by "includes/comprises a . . . " does not, without more constraints, preclude the presence of additional identical elements in the process, method, article, or apparatus that includes the element.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions in this application essentially or the part contributing to the related art may be implemented in the form of a software product. The computer software product is stored in a storage medium (for example, a ROM/RAM, a magnetic disk, or an optical disc), and includes several instructions for instructing an electronic device (which may be a mobile phone, a computer, a server, an air conditioner, a network device, or the like) to perform the method described in the embodiments of this application.

The embodiments of this application are described above with reference to the accompanying drawings. However, this application is not limited to the foregoing implementations. The foregoing implementations are merely exemplary rather than limitative, a person of ordinary skill in the art may still make, under the inspiration of this application, various forms without departing from the principle of this application and the protection scope of the claims, and all these forms are protected by this application.

What is claimed is:

1. An object tracking method, performed by an electronic device, the method comprising:
   acquiring a first image through a second camera in a case that a preview image acquired through a first camera is displayed, wherein the preview image and the first image comprise a plurality of objects, the plurality of objects are images of a plurality of first physical objects, and a resolution of the first image is greater than a resolution of the preview image;
   displaying at least one identifier in the preview image according to the first image, wherein the at least one identifier is used for indicating M target object(s) in the plurality of objects in the preview image, and M is a positive integer;
   receiving a first input for a first object in the M target object(s) in the preview image; and
   tracking a physical object corresponding to the first object and displaying an image of the physical object corresponding to the first object in response to the first input;
   wherein in a case that an identifier in the at least one identifier indicates the plurality of objects, before the receiving a first input for a first object in the M target object(s) in the preview image, the method further comprises:
      receiving an input for the identifier; and
      in response to the input, displaying the plurality of objects indicated by the identifier; and
   wherein the receiving the first input for the first object in the M target object(s) in the preview image comprises receiving the first input for the first object in the plurality of objects.

2. The method according to claim 1, wherein the tracking a physical object corresponding to the first object and displaying an image of the physical object corresponding to the first object in response to the first input comprises:
   displaying a second image in the preview image in response to the first input, wherein the second image comprises the first object displayed in an enlarged manner;
   receiving a second input for the second image; and
   tracking the physical object corresponding to the first object and displaying the image of the physical object corresponding to the first object in response to the second input.

3. The method according to claim 1, wherein before the acquiring a first image through a second camera, the method further comprises:
   receiving a third input for a recognition tracking control; and
   the acquiring a first image through a second camera comprises:
   acquiring the first image through the second camera in response to the third input.

4. The method according to claim 1, wherein a focal length of the second camera is greater than a focal length of the first camera.

5. An electronic device, comprising a processor, a memory, and a computer program stored in the memory and executable on the processor, wherein the computer program, when executed by the processor, causes the electronic device to perform:
   acquiring a first image through a second camera in a case that a preview image acquired through a first camera is displayed, wherein the preview image and the first image comprise a plurality of objects, the plurality of objects are images of a plurality of first physical objects, and a resolution of the first image is greater than a resolution of the preview image;
   displaying at least one identifier in the preview image according to the first image, wherein the at least one identifier is used for indicating M target object(s) in the plurality of objects in the preview image, and M is a positive integer;
   receiving a first input for a first object in the M target object(s) in the preview image; and
   tracking a physical object corresponding to the first object and displaying an image of the physical object corresponding to the first object in response to the first input;
   wherein in a case that an identifier in the at least one identifier indicates the plurality of objects, the computer program, when executed by the processor, causes the electronic device to further perform:
      receiving an input for the identifier; and
      in response to the input, displaying the plurality of objects indicated by the identifier; and
   wherein the computer program, when executed by the processor, causes the electronic device to perform receiving the first input for the first object in the plurality of objects.

6. The electronic device according to claim 5, wherein the computer program, when executed by the processor, causes the electronic device to perform:
   displaying a second image in the preview image in response to the first input, wherein the second image comprises the first object displayed in an enlarged manner;
   receiving a second input for the second image; and
   tracking the physical object corresponding to the first object and displaying the image of the physical object corresponding to the first object in response to the second input.

7. The electronic device according to claim 5, wherein the computer program, when executed by the processor, causes the electronic device to further perform:
   receiving a third input for a recognition tracking control; and
   the computer program, when executed by the processor, causes the electronic device to perform:
   acquiring the first image through the second camera in response to the third input.

8. The electronic device according to claim 5, wherein a focal length of the second camera is greater than a focal length of the first camera.

9. A non-transitory computer-readable storage medium, storing a computer program, wherein the computer program, when executed by a processor of an electronic device, causes the electronic device to perform:
   acquiring a first image through a second camera in a case that a preview image acquired through a first camera is displayed, wherein the preview image and the first image comprise a plurality of objects, the plurality of objects are images of a plurality of first physical objects, and a resolution of the first image is greater than a resolution of the preview image;
   displaying at least one identifier in the preview image according to the first image, wherein the at least one identifier is used for indicating M target object(s) in the plurality of objects in the preview image, and M is a positive integer;

receiving a first input for a first object in the M target object(s) in the preview image; and tracking a physical object corresponding to the first object and displaying an image of the physical object corresponding to the first object in response to the first input;

wherein in a case that an identifier in the at least one identifier indicates the plurality of objects, the computer program, when executed by the processor, causes the electronic device to further perform:

receiving an input for the identifier; and in response to the input, displaying the plurality of objects indicated by the identifier; and wherein the computer program, when executed by the processor, causes the electronic device to perform receiving the first input for the first object in the plurality of objects.

10. The non-transitory computer-readable storage medium according to claim 9, wherein the computer program, when executed by the processor, causes the electronic device to perform:

displaying a second image in the preview image in response to the first input, wherein the second image comprises the first object displayed in an enlarged manner;

receiving a second input for the second image; and tracking the physical object corresponding to the first object and displaying the image of the physical object corresponding to the first object in response to the second input.

11. The non-transitory computer-readable storage medium according to claim 9, wherein the computer program, when executed by the processor, causes the electronic device to further perform:

receiving a third input for a recognition tracking control; and the computer program, when executed by the processor, causes the electronic device to perform:

acquiring the first image through the second camera in response to the third input.

12. The method according to claim 1, wherein the displaying at least one identifier in the preview image according to the first image comprises:

recognizing at least one object in the first image according to target attribute information, to obtain M target object(s) in the first image, wherein attributes of physical objects corresponding to the M target object(s) in the first image belong to attributes indicated by the target attribute information; and displaying the at least one identifier in the preview image according to the M target object(s) in the first image.

13. The electronic device according to claim 5, wherein the computer program, when executed by the processor, causes the electronic device to perform:

recognizing at least one object in the first image according to target attribute information, to obtain M target object(s) in the first image, wherein attributes of physical objects corresponding to the M target object(s) in the first image belong to attributes indicated by the target attribute information; and displaying the at least one identifier in the preview image according to the M target object(s) in the first image.

14. The non-transitory computer-readable storage medium according to claim 9, wherein the computer program, when executed by the processor, causes the electronic device to perform:

recognizing at least one object in the first image according to target attribute information, to obtain M target object(s) in the first image, wherein attributes of physical objects corresponding to the M target object(s) in the first image belong to attributes indicated by the target attribute information; and displaying the at least one identifier in the preview image according to the M target object(s) in the first image.

15. The method according to claim 3, wherein the third input is a voice input of a user speaking "recognition tracking".

16. The method according to claim 12, wherein before the recognizing at least one object in the first image according to target attribute information, the method further comprises:

displaying at least one attribute option, wherein each attribute option is used for indicating one piece of attribute information; and receiving a fourth input for a target attribute option in the at least one attribute option; and the recognizing at least one object in the first image according to target attribute information comprises:

recognizing, in response to the fourth input, the at least one object in the first image according to target attribute information indicated by the target attribute option.

17. The method according to claim 12, wherein the recognizing at least one object in the first image according to target attribute information comprises:

obtaining at least one template image from a template library according to the target attribute information, wherein attributes of physical objects corresponding to objects in the at least one template image belong to the attributes indicated by the target attribute information; and matching the first image with the at least one template image, to recognize the at least one object in the first image.

18. The electronic device according to claim 13, wherein the computer program, when executed by the processor, causes the electronic device to further perform:

displaying at least one attribute option, wherein each attribute option is used for indicating one piece of attribute information; and receiving a fourth input for a target attribute option in the at least one attribute option; and the computer program, when executed by the processor, causes the electronic device to perform:

recognizing, in response to the fourth input, the at least one object in the first image according to target attribute information indicated by the target attribute option.

19. The electronic device according to claim 13, wherein the computer program, when executed by the processor, causes the electronic device to perform:

obtaining at least one template image from a template library according to the target attribute information, wherein attributes of physical objects corresponding to objects in the at least one template image belong to the attributes indicated by the target attribute information; and matching the first image with the at least one template image, to recognize the at least one object in the first image.

20. The non-transitory computer-readable storage medium according to claim 14, wherein the computer program, when executed by the processor, causes the electronic device to further perform:

displaying at least one attribute option, wherein each attribute option is used for indicating one piece of attribute information; and receiving a fourth input for a target attribute option in the at least one attribute option; and the computer program, when executed by the processor, causes the electronic device to perform:

recognizing, in response to the fourth input, the at least one object in the first image according to target attribute information indicated by the target attribute option.

* * * * *